United States Patent [19]

Kuncewitch et al.

[11] Patent Number: 5,077,053

[45] Date of Patent: Dec. 31, 1991

[54] ZEIN AS A MOISTURE BARRIER FOR SUGARLESS EDIBLE COMPOSITIONS AND METHOD FOR PREPARING SAME

[75] Inventors: Thomas J. Kuncewitch, Long Valley, N.J.; Jose Silva, Woodside; Daniel A. Orlandi, Flushing, both of N.Y.; Michael Glass, Fairlawn; Jose F. Zamudio-Tena, Morristown, both of N.J.

[73] Assignee: Warner-Lambert Company, Morris Plains, N.J.

[21] Appl. No.: 478,334

[22] Filed: Feb. 12, 1990

[51] Int. Cl.$^5$ .................... A61K 31/68; A61K 35/78; A61K 9/38; A23P 1/08

[52] U.S. Cl. .................................... 424/441; 424/477; 424/196.1; 514/783; 514/960; 514/970

[58] Field of Search ................ 424/440, 441, 477, 49; 514/783, 960, 970; 426/289, 291, 292, 293, 302, 303, 304, 323

[56] References Cited

U.S. PATENT DOCUMENTS

| | | | |
|---|---|---|---|
| 3,939,259 | 2/1976 | Pescetti | 424/459 |
| 4,753,790 | 6/1988 | Silva et al. | 424/482 |
| 4,814,163 | 3/1989 | Barth | 424/49 |
| 4,863,745 | 9/1989 | Zibell | 426/302 |
| 4,887,621 | 10/1989 | Ardaillon et al. | 424/438 |

*Primary Examiner*—Thurman Page
*Assistant Examiner*—E. J. Wedman
*Attorney, Agent, or Firm*—Craig M. Bell

[57] ABSTRACT

The present invention pertains to an edible coated composition which comprises (a) a core material comprising sorbitol, (b) a primary coating layer comprising zein over the core material, and (c) a sugarless secondary coasting layer over the primary coating layer. The present invention also pertains to methods for preparing the edible coated compositions.

19 Claims, No Drawings

ZEIN AS A MOISTURE BARRIER FOR SUGARLESS EDIBLE COMPOSITIONS AND METHOD FOR PREPARING SAME

BACKGROUND OF THE INVENTION

1. Field of the Invention

This invention pertains to the coating of sugarless tablets. More particularly, this invention pertains to the coating of moisture sensitive core material with a primary coating layer to protect the core material from the moisture employed in subsequent coating steps. Specifically, the invention is directed at an edible coated composition which comprises (a) a core material comprising sorbitol, (b) a primary coating layer comprising zein over the core material, and (c) a sugarless secondary coating layer over the primary coating layer. The present invention also pertains to methods for preparing the edible coated compositions.

2. Description of the Prior Art

Tablet coating is well known in the art. In general, the coating of a tablet involves the application of a primary coat (sealing coat), a subcoat, a sugar or sugarless syrup coat (grossing, heavy syrup coat, regular syrup coat), a finishing coat and a polishing coat (waxing coat). Tablets are coated to mask unpleasant taste, odor, and texture, to protect sensitive core ingredients from decomposition, and to improve the appearance and esthetic appeal of the tablet.

A frequent problem in tablet coating is that water from the coating layer solutions can migrate into the core material during the coating process or during subsequent storage. This water can cause swelling and subsequent cracking, bursting and clumping of the coated tablets. The purpose of the primary coat, which is applied directly over the uncoated tablet, is to seal and protect the core material from the water used in subsequent coating steps. Moisture absorption by the core is a particularly difficult problem when the core material is a very hygroscopic material such as a sugar alcohol. In addition, components in the core material, such as acidulants, can react with components in the coating layer solution, such as carbonates, and give the color of the final tablet a mottled appearance.

U.S. Pat. No. 4,673,577, issued to Patel and assigned to Wm. Wrigley Jr. Company, discloses a chewing gum which contains a shellac encapsulated intense sweetening agent.

U.S. Pat. No. 4,238,510, issued to Cherukuri et al. and assigned to Life Savers, Inc., discloses a sorbitol coated edible composition wherein sorbitol is present in the coating layer in an amount from about 45% to about 90% by weight. The coating may also contain mannitol and hydrogenated starch hydrolysates.

U.S. Pat. No. 4,643,894, issued to Porter et al. and assigned to Colorcon, Inc., discloses a maltodextrin coated pharmaceutical such as an aspirin.

U.S. Pat. No. 4,511,553, issued to Boesig et al. and assigned to Meggle Milchindustrie GmbH & Co. KG, discloses a coating process wherein the coating layer solution consists essentially of saccharose, at least one additional sugar, and water.

U.S. Pat. No. 4,610,891, issued to Miyamoto et al. and assigned to Zeria Shinyaku Kogu Kabushiki Kaisha, discloses a method for coating a pharmaceutical wherein the coating layer solution comprises an aqueous solution of sucrose and pullulan.

U.S. Pat. No. 3,832,473, issued to Sahaydak and assigned to Warner-Lambert Company, discloses a method for preparing pressed mints wherein the mints contain from about 1% to about 10% of a solid encapsulated flavoring agent which comprises a flavor oil emulsified in a mixture of corn syrup solids, an emulsifying agent, and glycerol or a nontoxic glycol.

*Principles of Pharmaceutical Processing*, Chapter 10, pp. 202–203, discloses that cellulose acetate phthalate, zein, shellac and certain resins may be used as the primary coating layer to protect core materials from water in sugar coating processes.

U.S. Pat. No. 4,753,790, issued to Silva et al. and assigned to Warner-Lambert Company, discloses a method for preparing a sorbitol coated edible composition which comprises applying to a substantially anhydrous edible core material a first coating solution which comprises (a) about 77% to about 81% by weight sorbitol solution comprising about 65% to about 75% by weight sorbitol, (b) about 9.5% to about 12.5% by weight crystalline sorbitol powder, (c) about 0.25% to about 1.5% by weight of at least one film-forming agent, and (d) about 0.1% to about 5.0% by weight of at least one crystallization retarding agent, and a second coating solution which comprises (a) about 82% to about 92% by weight sorbitol solution comprising about 65% to about 75% by weight sorbitol, (b) about 1.0% to about 2.5% by weight crystalline sorbitol powder, (c) about 0.05% to about 2.0% by weight of at least one film-forming agent, and (d) about 0.1% to about 0.3% by weight of at least one crystallization retarding agent.

Accordingly, many different types of coating materials are known to protect different types of core materials. None of the above references, however, discloses a primary coating material suitable for protecting very hygroscopic core materials such as sugar alcohols. Hence, there is a need for a primary coating layer to protect sugar alcohol core materials from moisture. Such moisture protected sugar alcohol cores would be useful as ingestible compositions by providing non-cariogenic edible compositions. The present invention provides such moisture protected sugarless core compositions and the ingestible compositions in which the moisture protected sugarless core compositions may be incorporated.

SUMMARY OF THE INVENTION

The present invention pertains to an edible coated composition which comprises (a) a core material comprising sorbitol, (b) a primary coating layer comprising zein over the core material, and (c) a sugarless secondary coating layer over the primary coating layer. The present invention also pertains to methods for preparing the edible coated compositions.

DETAILED DESCRIPTION OF THE INVENTION

The present invention pertains to an edible coated composition which comprises (a) a core material comprising sorbitol, (b) a primary coating layer comprising zein over the core material, and (c) a sugarless secondary coating layer over the primary coating layer. The present invention also pertains to methods for preparing the edible coated compositions.

In a preferred embodiment, the core material in the present invention is present in an amount from about 40% to about 60%, more preferably from about 45% to about 55%, and most preferably from about 47% to about 53%, by weight of the edible coated composition. In another preferred embodiment, the primary coating layer in the present invention is present in an amount from about 0.1% to about 1.5%, more preferably from about 0.1% to about 1%, and most preferably from about 0.1% to about 0.6%, by weight of the edible coated composition. In yet another preferred embodiment, the secondary coating layer in the present invention is present in an amount from about 40% to about 60%, more preferably from about 45% to about 55%, and most preferably from about 47% to about 53%, by weight of the edible coated composition.

Applicants define the terms "ingestible" and "edible" to include all materials and compositions which are used by or which perform a function in the body. Materials and compositions which are adsorbed and those which are not absorbed as well as those which are digestible and non-digestible are included.

Applicants have found that when a hygroscopic core material such as a core comprising sorbitol is coated with a primary coating layer comprising zein, the core material is protected from moisture during subsequent coating layer steps and during storage. While not wishing to be bound by theory, applicants believe that aqueous alcoholic solutions of zein dry quickly allowing very little water to penetrate into the core material. In addition, because zein is water-insoluble, subsequent aqueous coating layer solutions do not dissolve and penetrate the zein moisture barrier. This combination of properties, a quick drying coating solution and the insolubility of zein in water, also make zein coating layers useful in preventing reactions between components in the core material, such as acidulants, and components in the coating layer solution, such as carbonates. Such reactions between components in the core material and the coating layer can generate by products, such as gases and oxidizing agents, which can adversely effect coloring agents present in the coating layer to give the final tablet a mottled appearance.

The core material in the present invention is a sugarless edible core such as a sugar alcohol core material. Suitable sugar alcohol core materials include sorbitol, xylitol, mannitol, galactitol, maltitol, lactitol, and mixtures thereof. Mixtures of sorbitol and mannitol are the preferred sugar alcohol core material. In a more preferred embodiment, sorbitol is the sugar alcohol core material.

The core material of this invention may optionally include effective amounts of fillers which may serve as mineral adjuvants and textural agents. Useful mineral adjuvants include calcium carbonate, magnesium carbonate, alumina, aluminum hydroxide, aluminum silicate, talc, tricalcium phosphate, dicalcium phosphate, and the like, and mixtures thereof. Other fillers include celluloses, microcrystalline cellulose, mannitol, maltitol, and isomalt (a racemic mixture of alpha-D-glucopyranosyl-1,6-mannitol and alpha-D-glucopyranosyl-1,6-sorbitol manufactured under the tradename Palatinit by Suddeutsche Zucker). These fillers or adjuvants may be used in the core material in various amounts. Preferably the amount of filler, when used, will be present in an amount from about 10% to about 40%, and preferably from about 10% to about 30%, by weight of the core material.

A variety of traditional ingredients may optionally be included in the core material in effective amounts such as intense sweetening agents, flavoring agents, coloring agents, breath freshening agents, lubricating agents, emulsifying agents, antioxidants, preservatives, binding agents, and the like. Other conventional core material additives known to one having ordinary skill in the confectionery art may also be used in the core material.

The intense sweetening agents (intense sweeteners) used may be selected from a wide range of materials including water-soluble sweetening agents, water-soluble artificial sweetening agents, water-soluble sweetening agents derived from naturally occurring water-soluble sweetening agents, dipeptide based sweetening agents, and protein based sweetening agents, including mixtures thereof. Without being limited to particular sweetening agents, representative categories and examples include:

(a) water-soluble sweetening agents such as dihydrochalcones, monellin, steviosides, glycyrrhizin, dihydroflavenol, and sugar alcohols such as sorbitol, mannitol, maltitol, and L-aminodicarboxylic acid aminoalkenoic acid ester amides, such as those disclosed in U.S. Pat. No. 4,619,834, which disclosure is incorporated herein by reference;

(b) water-soluble artificial sweetening agents such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and the like, and mixtures thereof;

(c) dipeptide based sweetening agents, such as L-aspartic acid derived sweetening agents, such as L-aspartyl-L-phenylalanine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenylglycine, L-aspartyl-2,5-dihydro-L-phenylalanine; L-aspartyl-L-(1-cyclohexen)-alanine, and the like, and mixtures thereof;

(d) water-soluble sweetening agents derived from naturally occurring water-soluble sweetening agents, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalacto-sucrose derivatives include but are not limited to: 1-chloro-1'-deoxysucrose; 4-chloro-4-deoxy-alpha-D-galacto-pyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1',6'-dichloro-1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galacto-pyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galacto-pyranosyl-1,6-dichloro-1,6-dideoxy-beta-D-fructofuranoside, or 4,6,1',6'-tetrachloro-4,6,1',6'-tetradeoxygalacto-sucrose; and 4,6,1',6'-tetrachloro-4,6,1',6'-tetradeoxy-sucrose; and (e) protein based sweetening agents such as *Thaumatoccous danielli* (Thaumatin I and II).

In a preferred embodiment, the intense sweetening agent is selected from the group consisting of Aspartame, Saccharin, Acesulfame-K, Alitame, Sucralose, and the like, and mixtures thereof.

In general, an effective amount of intense sweetener is utilized to provide the level of sweetness desired, and this amount will vary with the intense sweetener selected. The exact range of amounts for each type of intense sweetener is well known in the art and is not the subject of the present invention. In a preferred embodiment, the intense sweetening agent will be present in the edible composition in an amount from about 0.01% to about 0.5%, more preferably in an amount from about 0.1% to about 0.4%, and most preferably in an amount from about 0.2% to about 0.3%, by weight of the edible composition.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in *Chemicals Used in Food Processing*, publication 1274, pages 63-258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, and the like, and mixtures thereof.

In a preferred embodiment, the flavoring agent is selected from the group consisting of peppermint oil, spearmint oil, cinnamon oil, wintergreen oil, and the like, and mixtures thereof.

The amount of flavoring agent employed herein is normally a matter of preference subject to such factors as the type of final edible composition, the individual flavor, the core material employed, and the strength of flavor desired. Thus, the amount of flavoring may be varied in order to obtain the result desired in the final product and such variations are within the capabilities of those skilled in the art without the need for undue experimentation. In edible compositions, the flavoring agent is generally present in amounts from about 0.02% to about 5%, and preferably from about 0.1% to about 3%, and more preferably, from about 0.5% to about 2%, by weight of the edible composition.

In addition to the flavoring agents set out above, acidulant flavoring agents, such as organic acids, may also be present in the edible composition. Suitable acidulant flavoring agents are selected from the group consisting of adipic acid, ascorbic acid, citric acid, fumaric acid, lactic acid, malic acid, tartaric acid, and the like, and mixtures thereof. Acidulant flavoring agents when used will be present in the edible composition in an amount from about 0.5% to about 10%, preferably from about 0.5% to about 6%, and more preferably from about 0.5% to about 3%, by weight of the edible composition.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, encapsulated forms, and the like, and mixtures thereof.

Encapsulated delivery systems for flavoring agents or sweetening agents comprise a hydrophobic matrix of fat or wax surrounding a sweetening agent or flavoring agent core. The fats may be selected from any number of conventional materials such as fatty acids, glycerides or polyglycerol esters, sorbitol esters, and the like, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil, and the like, and mixtures thereof. Glycerides which are useful include monoglycerides, diglycerides, and triglycerides.

Waxes useful may be chosen from the group consisting of natural and synthetic waxes, and mixtures thereof. Non-limiting examples include paraffin wax, petrolatum, carbowax, microcrystalline wax, beeswax, carnauba wax, candellila wax, lanolin, bayberry wax, sugarcane wax, spermaceti wax, rice bran wax, and the like, and mixtures thereof.

The fats and waxes may be use individually or in combination in amounts varying from about 10 to about 70%, and preferably in amounts from about 40 to about 58%, by weight of the encapsulated system. When used in combination, the fat and wax are preferably present in a ratio from about 70:10 to 85:15, respectively.

Typical encapsulated flavoring agent delivery systems are disclosed in U.S. Pat. Nos. 4,597,970 and 4,722,845, which disclosures are incorporated herein by reference. A particularly preferred encapsulated flavoring agent system for use in pressed mints is disclosed in U.S. Pat. No. 3,832,473, which disclosure is incorporated herein by reference.

The coloring agents (colorants) useful in the present invention are used in amounts effective to produce the desired color. These coloring agents include pigments which may be incorporated in amounts up to about 6%, by weight of the edible composition. A preferred pigment, titanium dioxide, may be incorporated in amounts up to about 2%, and preferably less than about 1%, by weight of the edible composition. The coloring agents may also include natural food colors and dyes suitable for food, drug and cosmetic applications. These coloring agents are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No.1 comprises a triphenylmethane dye and is the monosodium salt of 4-[4-(N-ethyl-p-sulfoniumbenzylamino) diphenylmethylene]-[1-(N-ethyl -N-p-sulfoniumbenzyl)-delta-2,5-cyclohexadieneimine]. A full recitation of all F.D.& C. coloring agents and their corresponding chemical structures may be found in the Kirk-Othmer Encyclopedia of Chemical Technology, 3rd Edition, in volume 5 at pages 857-884, which text is incorporated herein by reference.

Breath freshening agents which may be used in the core material in the present invention include mixtures of copper gluconate-magnesium stearate-cottonseed oil, chlorophyll, copper chlorophyll, and the like, as well as those described in U.S. Pat. No. 4,409,202, which disclosure is incorporated herein by reference. In general, breath freshening agents may be used in the core material in amounts from about 0.01% to about 1%, and preferably from about 0.5% to about 0.8%, by weight of the core material.

Suitable lubricating agents in the present invention include magnesium stearate, calcium stearate, and the like, and mixtures thereof. In general, these lubricating agents may be used in the core material in amounts from about 0.01% to about 41%, and preferably from about 0.1% to about 3%, by weight of the core material.

Emulsifying agents aid in dispersing immiscible components into a single stable system. Emulsifying agents (surface active agents, surfactants, wetting agents, emulsifiers) are compounds which, inter alia, reduce interfacial tension between a liquid and a solid. Emulsifying agents useful in this invention include acetylated monoglycerides (Cetodan), stearic acid, oleic acid, polyethylene glycol, glyceryl monostearate, lecithin, fatty acid monoglycerides (Dimodan), diglycerides, propylene glycol monostearate, lecithin, and the like, and mixtures thereof. The preferred emulsifying agents are selected from the group consisting of glyceryl monostearate, acetylated monoglycerides, stearic acid, and the like, and mixtures thereof. The more preferred emulsifying agent is glyceryl monostearate. In general, these emulsifying agents may be used in the core material in amounts from about 0.01% to about 0.2%, by weight of the core material.

Useful anti-oxidants or preservatives in the present invention include butylated hydroxytoluene (BHT), butylated hydroxyanisole (BHA), propyl gallate, tocopherol, and the like, and mixtures thereof. In general, these preservatives may be used in the core material in amounts from about 0.01% to about 0.1%, by weight of the core material.

Useful binding agents in the present invention include hydroxy propyl cellulose, starch, and the like, and mixtures thereof. In general, these binding agents may be used in the core material in amounts from about 1% to about 5%, by weight of the core material.

A preferred core material or tablet composition in the present invention contains the following ingredients in percentages by weight of the core composition:

| Ingredient | Percentage by Weight |
| --- | --- |
| Sorbitol | 84.00-98.00 |
| Acidulant | 0.50-3.00 |
| Breath freshening agent | 0.50-0.80 |
| Intense sweetening agent | 0.00-0.10 |
| Flavoring agent | 0.50-2.00 |
| Lubricating agent | 0.10-0.50 |
| Vegetable oil | 0.00-0.50 |
| Emulsifying agent | 0.00-0.20 |
| Coloring agent | 0.00-0.03 |
| Fillers | 0.00-15.00 |

The present invention extends to methods of making the core material compositions. The core materials may be prepared and pressed into tablets using standard techniques and equipment known to those skilled in the art. The apparatus useful in accordance with the present invention comprises mixing and tablet forming apparatus well known in the confectionery manufacturing arts, and therefore the selection of the specific apparatus will be apparent to the artisan.

In such a method, a pressed tablet is prepared by admixing the sugar alcohol together with the other conventional core material ingredients. Other ingredients will usually be incorporated into the composition as dictated by the nature of the desired composition as well known by those having ordinary skill in the art. The mixture is then screened to an appropriate particle size followed by the addition of a lubricating agent. The final mixture is introduced into a tablet machine to form the compressed tablet or mint. The ultimate edible core compositions are readily prepared using methods generally known in the food technology and pharmaceutical arts.

Once prepared, the pressed core compositions may be stored for future use or may be coated directly with the primary coating layer of the present invention to prepare a wide variety of moisture protected edible products.

The primary coating layer of the present invention comprises zein. Zein is a white to slightly yellow odorless, tasteless, nontoxic protein of the prolamine class. Zein is obtained by extracting gluten meal with 85% isopropyl alcohol, extracting the zein from the alcoholic extract with hexane, and precipitating the zein from the hexane with water. Zein contains 17 amino acids and is free of cystine, lysine, and tryptophan. The greater part of zein has a molecular weight of 38,000. Zein is soluble in aqueous alcohol and insoluble in water and anhydrous alcohols except methanol.

In a preferred embodiment, the solution of primary coating layer composition is a solution from about 10% to about 20% of zein in aqueous alcohol. In a more preferred embodiment, the solution of primary coating layer composition is a solution from about 12% to about 15% of zein in aqueous alcohol. Preferably, the aqueous alcohol is aqueous propylene glycol. In general the aqueous alcohol solution comprises from about 75% to about 95% alcohol in water. In a most preferred embodiment, the solution of primary coating layer composition is about a 20% aqueous solution of zein in polyethylene glycol, commercially available under the tradename of Aquazein and manufactured by Freeman Industries, Tuckahoe, N.Y.

The present invention extends to methods of coating the core material with a solution of the primary coating layer composition. The coated core materials may be prepared using standard techniques, such as pan coating, and equipment known to those skilled in the art. The apparatus useful in accordance with the present invention comprises mixing and drying apparatus well known in the confectionery manufacturing arts, and therefore the selection of the specific apparatus will be apparent to the artisan.

In such a method, an appropriate quantity of pressed core material or tablets is placed into a revolving coating pan and dedusted. The revolving pan has a revolution speed in the range from about 28 rpm to about 30 rpm and is equipped to dry the tablets with conditioned air having a temperature from about 29° C. to about 33° C. and a relative humidity from about 20% RH to about 27% RH. The primary coating layer solution is added to the pressed cores in the revolving pan in portions until the desired amount or thickness of coating is deposited on the core composition. Before each subsequent portion of coating solution is applied, the prior coating is allowed to dry by gently flowing the conditioned air over the coated composition. Generally, the coating dries in about 15 to 20 minutes and from 4 to 6 applications of primary coating layer are applied to the core. Calcium carbonate powder is then added to the revolving pan without conditioned air to prevent the coated tablets from sticking. The core composition coated with the primary layer is then removed from the coating pan and spread on trays and allowed to dry for 12 hours. The ultimate primary layer coated core compositions are readily prepared using methods generally known in the food technology and pharmaceutical arts.

Once prepared, the primary layer coated core compositions may be stored for future use or may be coated directly with the secondary coating layer of the present invention to prepare a wide variety of moisture protected edible products, such as foodstuffs, hard and soft confectionery products, tablets and pharmaceutical compositions.

The sugarless secondary coating layer of the present invention is preferably sorbitol. The secondary layer coated core composition is obtained by applying to the primary coated core at least one solution of a secondary coating layer, and preferably two solutions of a secondary coating layer. Each sorbitol coating layer solution comprises a saturated sorbitol solution, a crystalline sorbitol powder, one or more film-forming agents and one or more crystallization retarding agents.

In one embodiment, the solution of secondary coating layer composition comprises in percentages by weight:
 (a) from about 77% to about 83%, preferably about 79% to about 80%, of sorbitol solution, comprising from about 65% to about 75%, preferably about 70%, sorbitol,
 (b) from about 9.5% to about 12.5%, preferably from about 10% to about 12%, more preferably from about 10.2% to about 11.8%, crystalline sorbitol powder,
 (c) from about 0.25% to about 1.5%, preferably from about 0.3% to about 1.5%, more preferably from about 0.5% to about 1.0%, of at least one film-forming agent, and
 (d) from about 0.1% to about 5.0%, preferably from about 1.5% to about 4.5%, of at least one crystallization retarding agent.

In another embodiment, the solution of secondary coating layer comprises two solutions of a secondary coating layer wherein the first solution of coating layer comprises in percentages by weight:
 (a) from about 77% to about 83%, preferably about 79% to about 80%, of sorbitol solution, comprising from about 65% to about 75%, preferably about 70%, sorbitol,
 b) from about 9.5% to about 12.5%, preferably from about 10% to about 12%, more preferably from about 10.2% to about 11.8%, crystalline sorbitol powder,
 (c) from about 0.25% to about 1.5%, preferably from about 0.3% to about 1.5%, more preferably from about 0.5% to about 1 0%, of at least one film-forming agent, and
 d) from about 0.1% to about 5.0%, preferably from about 1.5% to about 4.5%, of at least one crystallization retarding agent, and
the second solution of coating layer comprises in percentages by weight:
 (a) from about 82% to about 94%, preferably from about 85% to about 88%, sorbitol solution comprising from about 65% to about 75%, preferably about 70%, sorbitol,
 (b) from about 1.0% to about 3.5%, preferably from about 1.5% to about 2.2%, crystalline sorbitol powder,
 (c) from about 0.05% to about 2.0%, preferably from about 0.6% to about 2.0%, more preferably from about 0.6% to about 1.5%, of at least one film-forming agent, and
 (d) from about 0.1% to about 0.3%, preferably from about 0.15% to about 0.25%, of at least one crystallization retarding agent.

The sorbitol solution is a saturated solution of sorbitol. The concentration of sorbitol in saturated solution may vary with the temperature of the solution, but generally such saturated solutions contain from about 65% to about 75% sorbitol, with about 70% being preferred. Sufficient saturated sorbitol solution is utilized in the coating solution so that in combination with the crystalline sorbitol powder, a relatively uniform crystallization of sorbitol occurs upon application of the coating solution to the core material.

Similarly, sufficient crystalline sorbitol powder is utilized in combination with the amount of saturated sorbitol solution used so that a relatively uniform crystallization of sorbitol occurs when the coating solution is applied to the core material. An insufficient amount of sorbitol crystalline powder can result in poor crystallization and coatings that do not properly adhere to the core material. For example, in the application of multiple coatings, the coating being applied may dissolve the previous coating which was applied. This results in coatings having a poor or aesthetically undesirable appearance.

At least one film-forming agent is utilized in the secondary coating layer solution. Representative film-forming agents include hydroxypropyl cellulose, methyl cellulose, (i.e., methyl ether of cellulose) ethyl cellulose, hydroxypropyl methyl cellulose, hydroxyethyl cellulose, carboxymethyl cellulose, gelatin, and the like, and mixtures thereof. Preferably, a branched chained film-forming agent, such as hydroxypropyl cellulose, is utilized. Preferably, the hydroxypropyl cellulose has a Brookfield viscosity of not less than about 145 cps for a 10% aqueous solution at 25° C. Preferably, the hydroxypropyl methyl cellulose and the methyl cellulose have a Brookfield viscosity from about 12 cps to about 18 cps for a 2% aqueous solution at 25° C. The coating solution can contain more than one film-forming agent and, for example, hydroxypropyl cellulose and methyl cellulose may be utilized. In such a combination, the branched chained film-forming agent (e.g., hydroxypropyl cellulose) can be used in amounts from about 0.05% to about 1.5%, with about 0.01% to about 0.5% being preferred. The straight chained film-forming agent (e.g., methyl cellulose) can be used in amounts from about 0.5% to about 1.0%, with from about 0.1% to about 0.5% being preferred.

The crystallization retarding agent prevents premature crystallization of sorbitol. Representative examples of such retarding agents include calcium carbonate, talc, magnesium trisilicate, titanium dioxide, and the like, and mixtures thereof. The preferred retarding agents are titanium dioxide and calcium carbonate. More preferably, a combination of calcium carbonate and titanium dioxide is employed wherein calcium carbonate is present in amounts from about 0.2% to about 3.0%, preferably about 0.4% to about 2.0%, and titanium dioxide is present in amounts from about 0.5% to about 1.0%, preferably about 0.25% to about 0.8%.

A variety of traditional ingredients may be optionally included in effective amounts in the secondary coating layer such as plasticizing agents, binding agents, intense sweetening agents, coloring agents, and moisture absorbing agents. Other conventional coating layer additives known to one having ordinary skill in the confectionery art may also be used in the secondary coating layer.

Plasticizing agents (plasticizers) suitable for use in the secondary coating layer are water soluble. Examples of plasticizing agents include polyethylene glycol, polyvinylpyrrolidone, oligomers of polypropylene glycol (e.g., such as those having an average molecular weight from about 1000 to about 2000), polyvinyl alcohol, low molecular weight polyvinyl acetate (e.g., such as those having average molecular weights from about 800 to about 1200), water soluble natural gums, such as alginates, xanthan gum, carrageenan, and agar agar, and the like, and mixtures thereof. The plasticizing agent is optionally used in the first coating solution in amounts from about 0.2% to about 0.5%, with from about 0.25% to about 0.35% being preferred. The plasticizing agent is optionally used in the second coating solution in amounts from about 0.4% to about 1.0%, with from about 0.4% to about 0.8% being preferred. The preferred plasticizing agent is polyethylene glycol.

Binding agents (binders) suitable for use in the secondary coating layer include gum arabic, xanthan gum, gum tragacanth, tapioca dextrin, modified food starch, zein, and the like, and mixtures thereof. Gum arabic is the preferred binding agent. In the first coating solution, the binding agent is generally used in amounts from about 0.05% to about 0.2%, with from about 0.05% to about 0.3% being preferred. In the second coating solution, the binding agent is generally used in amounts from about 0.05% to about 0.3%, with from about 0.1% to about 0.25% being preferred.

Intense sweetening agents such as those described above as suitable for use in the core material may optionally be employed in the secondary coating solutions. These sweetening agents may be used in amounts from about 0.005% to about 0.5%, based on the weight of the coating, and preferably from about 0.05% to about 0.25%. Usually the first coating solution can contain from about 0.02% to about 0.06%, based on the weight of the coating, preferably from about 0.03% to about 0.06%, and most preferably about 0.05% of intense sweetening agent. The second coating solution can usually contain from about 0.05% to about 0.2%, based on the weight of the coating, with from about 0.08% to about 0.15% being preferred, of intense sweetening agent.

Coloring agents such as those described above as suitable for use in the core material may optionally be employed in the secondary coating solutions. These coloring agents include pigments which may be incorporated in amounts up to about 6%, by weight of the edible composition.

Suitable moisture absorbing agents (moisture absorbents) in the secondary coating layer, when used, can be mannitol, dicalcium phosphate, talc, magnesium stearate, calcium phosphate, calcium sulfate, silica, and the like, and mixtures thereof. Examples of silica which may be useful include amorphous silica, synthetic amorphous silica, hydrous silica gels, synthetic silicas, sodium aluminum silicates, precipitated amorphous silicon dioxide of ultra fine particle size, and the like. Usually, the moisture absorbing agent is used in amounts from about 0.5% to about 3.0%, with from about 0.5% to about 1.5% being preferred, in the first coating solution. Mannitol is the preferred moisture absorbing agent.

Sorbitol coated edible compositions are described in detail in U.S. Pat. No. 4,753,790, which disclosure is incorporated herein by reference.

The sorbitol coated core materials may be prepared using standard techniques and equipment known to those skilled in the art. The apparatus useful in accordance with the present invention comprises mixing and drying apparatus well known in the confectionery manufacturing arts, and therefore the selection of the specific apparatus will be apparent to the artisan.

The secondary coating layer solution may be applied utilizing known techniques, such as pan coating. For example, in a pan coating method the cores coated with a primary coating layer are placed in a revolving coating pan and dedusted using cool dry air. The secondary coating layer solution is added to the revolving pan in portions until the desired amount or thickness of secondary coating is deposited on the edible composition. Before each subsequent portion of secondary coating layer solution is applied, the prior coating is allowed to dry by gently flowing conditioned air (having a temperature from about 29° C. to about 33° C. and a relative humidity from about 20% RH to about 27% RH) over the coated composition. Generally, the secondary coating dries in from about 6 to about 10 minutes.

In general, the application of the sorbitol coating solution can be repeated as many times as necessary to build up a desired coating weight and thickness on the core material. For example, from about 15% to about 30% of a first coating layer may be obtained from about 18 to about 40 applications of the first coating solution. The second coating solution may then be applied until the desired amount or thickness is added to the first coating layer. For example, an additional coating layer from about 5% to about 15% may be added in about 10 to 15 coating solution applications of the second coating solution. Similarly, a third coating solution may optionally be applied in one or more applications until the desired amount or thickness is obtained.

At any desired point in the sequence, a coating application of flavoring agents may be added. Usually the flavoring agents are added as a separately applied coating to the coated core being produced. After the desired coating amount or thickness is obtained, a coating layer comprising a binding agent may be applied to the sorbitol coated edible composition. After all coating solutions are applied, the coated edible composition may then be placed in a polishing pan for the application of a finishing (waxing) coating.

Suitable flavoring agents which may be added to the secondary coating layer include those described above for use in the core material compositions. In a preferred embodiment, the flavoring agent may be selected from the group consisting of peppermint oil, spearmint oil, cinnamon oil, wintergreen oil, and the like, and mixtures thereof. When applied in the coating layer, the flavoring agent is usually used in amounts from about 0.05% to about 0.10%, with from about 0.06% to about 0.09% being preferred, and from about 0.07% to about 0.09% being most preferred.

The binding agent is applied using a coating solution comprising at least one binding agent described above as useful in the sorbitol coating layer. The solution of binding agent coating layer can contain from about 20% to about 30% of a binding agent, with about 25% being preferred.

After the final application of coating layer solution, and after such applied coating has dried, a finishing (waxing) coating is preferably applied to the coated edible composition. The finishing coating seals out moisture and aids in giving the coated edible composition a polished appearance. The finishing coating comprises a sealing agent such as, for example, a blend of natural and artificial food grade waxes (such as a blend of beeswax, microcrystalline wax, shellac, and the like, and mixtures thereof). Usually, the finishing coating comprises from about 0.01% to about 0.6% of the total coating, with from about 0.05% to about 0.2% being preferred.

In a specific embodiment, the present invention is directed to a method for preparing an edible coated composition which comprises the steps of (A) providing the following ingredients (a) a solid core material composition which comprises sorbitol, (b) a solution of a primary coating layer composition which comprises zein, (c) a solution of a sugarless secondary coating layer composition, and (B) forming the core material composition into a suitable shape, (C) coating the core material from step (B) with the primary coating layer solution, (D) drying the coated core material from step (C), (E) coating the coated core material from step (D) with the secondary coating layer solution, and (F) drying the coated core material from step (E).

In another specific embodiment, the present invention is directed to a method for protecting a moisture-sensitive core material comprising sorbitol which comprises the steps of (A) providing the following ingredients (a) a solid core material composition which comprises sorbitol, (b) a solution of a primary coating layer composition which comprises zein, (c) a solution of a sugarless secondary coating layer composition, and (B) forming the core material composition into a suitable shape, (C) coating the core material from step (B) with the primary coating layer composition, (D) drying the coated core material from step (C), (E) coating the coated core material from step (D) with the secondary coating layer composition, and (F) drying the coated core material from step (E).

In another specific embodiment, the present invention is directed to a method for protecting the color of a sugarless coating layer in an edible composition which comprises the steps of (A) providing the following ingredients (a) a solid core material composition which comprises sorbitol and an acidulant, (b) a solution of a primary coating layer composition which comprises zein, (c) a solution of a sugarless secondary coating layer composition which comprises a coloring agent and a metal carbonate, and (B) forming the core material composition into a suitable shape, (C) coating the core material from step (B) with the primary coating layer composition, (D) drying the coated core material from step (C), (E) coating the coated core material from step (D) with the secondary coating layer composition, and (F) drying the coated core material from step (E).

The present invention is further illustrated by the following examples which are not intended to limit the effective scope of the claims. All parts and percentages in the examples and throughout the specification and claims are by weight of the final composition unless otherwise specified.

EXAMPLE 1

This example demonstrates the preparation of a conventional edible coated composition (control) without the application of a primary coating layer comprising zein over the core material.

The composition of the core material is set out in Table 1. The core material was prepared by admixing the sorbitol together with other ingredients of the core. The mixture was then screened to an appropriate particle size followed by the addition of the lubricating agent. The final mixture was pressed in a tablet machine to form the compressed tablet or mint.

TABLE 1

| CORE MATERIAL COMPOSITION | |
| --- | --- |
| Ingredient | Percentage by Weight |
| Sorbitol | 96.80 |
| Acidulant | 1.00 |
| Breath freshening agent | 0.75 |
| Intense sweetening agent | 0.05 |
| Flavoring agent | 0.75 |
| Lubricating agent | 0.30 |
| Vegetable oil | 0.20 |
| Emulsifying agent | 0.15 |

The pressed core material or tablets were then placed into a revolving coating pan which had a revolution speed in the range of 28 rpm–30 rpm and which dried coated material with conditioned air having a temperature from about 29° C. to about 33° C. and a relative humidity from about 20% RH to about 27% RH.

The composition of the sorbitol coating solutions used to coat the core material are set out in Table 2. The sorbitol coating layer solution was added to the revolving pan in portions until the desired thickness of secondary coating was deposited on the core composition. The sorbitol coating solutions were coated over the core compositions over 40 to 60 applications using 80–150 g of coating solution per application until the desired amount of sorbitol coating was applied (25%-49% coating by weight of the entire pressed tablet). Before each subsequent portion of sorbitol coating layer solution was applied, the prior coating was allowed to dry by gently flowing conditioned air, temperature from about 29° C. to about 33° C. and relative humidity from about 20% RH to about 27% RH, over the coated composition. The final coated core product was then removed from the revolving coating pan and stored in a Low Humidity Conditioning Room for 24 hours before the coated cores were wax polished.

TABLE 2

SORBITOL COATING LAYER COMPOSITION

| Ingredient | Percentage by Weight |
|---|---|
| Sorbitol liquid (70%) | 82.10 |
| Sorbitol | 11.00 |
| Gum arabic | 0.15 |
| Flavoring agent | 0.20 |
| Coloring agent | 0.02 |
| Crystallization retarding agent | 2.50 |
| Film-forming agent | 0.80 |
| Water | 3.23 |

The wax coated final product was stored in a high temperature (26° C.), high humidity (80% RH) incubator. After two days storage, the sorbitol coated core, without a primary coating layer of zein, had absorbed moisture and the texture of the pressed tablet began to soften. The surface of the pressed tablet began to bubble giving the color of the tablet a mottled appearance.

EXAMPLE 2

This example demonstrates the preparation of an edible coated composition according to the method of the present invention wherein a primary coating layer comprising zein was applied over the core material.

The core material was prepared and pressed into a tablet according to the method set out in Example 1. The pressed tablets were then placed into a revolving coating pan which had a revolution speed in the range of from 28 rpm to 30 rpm and which dried coated tablets with conditioned air having a temperature from about 29° C. to about 33° C. and a relative humidity from about 20% RH to about 27% RH.

The composition of the primary coating layer solution comprising zein used to coat the core material is set out in Table 3. The primary coating layer solution was added to the revolving pan in portions until the desired thickness of primary coating was deposited on the core composition. The primary coating solution was coated over the core compositions over 4 to 6 applications and allowed to dry 15-20 minutes between applications using conditioned air. In general, a 1% coating of zein was applied to the core material, by weight of the core material. Calcium carbonate powder was then applied to the revolving pan to prevent the coated tablets from sticking using no conditioned air. The primary coated composition was then removed from the coating pan and spread on trays and allowed to dry for 12 hours.

TABLE 3

PRIMARY COATING LAYER SOLUTION

| Ingredient | Percentage by Weight |
|---|---|
| Zein | 20.00 |

The primary coated core composition was then placed back in the revolving coating pan. The first sorbitol coating solution used to coat the coated core material is set out in Table 4 and the second sorbitol coating solution is set out in Table 5. The sorbitol coating layer solution was added to the revolving pan in portions until the desired thickness of secondary coating was deposited on the core composition. The sorbitol coating solutions were coated over the core compositions over 40 to 60 applications using 80-150 g of coating solution per application until the desired amount of sorbitol coating was applied (47% coating by weight of the entire pressed tablet). Before each subsequent portion of sorbitol coating layer solution was applied, the prior coating was allowed to dry by gently flowing conditioned air, temperature from about 29° C. to about 33° C. and relative humidity from about 20% RH to about 27% RH, over the coated composition. The final sorbitol coated core product was then removed from the revolving coating pan and stored in a Low Humidity Conditioning Room for 24 hours before the coated cores were wax polished. In general, the wax coating comprised from about 0.03% to about 0.2% by weight of the final pressed tablet.

TABLE 4

FIRST SORBITOL COATING LAYER COMPOSITION

| Ingredient | Percentage by Weight |
|---|---|
| Sorbitol liquid (70%) | 82.10 |
| Sorbitol | 11.00 |
| Gum arabic | 0.15 |
| Flavoring agent | 0.20 |
| Coloring agent | 0.02 |
| Crystallization retarding agent | 2.50 |
| Film-forming agent | 0.80 |
| Water | 3.23 |

TABLE 5

SECOND SORBITOL COATING LAYER COMPOSITION

| Ingredient | Percentage by Weight |
|---|---|
| Sorbitol liquid (70%) | 93.92 |
| Sorbitol | 3.00 |
| Gum arabic | 1.00 |
| Flavoring agent | 0.05 |
| Coloring agent | 0.03 |
| Film-forming agent | 2.00 |

The final waxed coated product (about 49% by weight sorbitol coated tablet) and an intermediate waxed coated product (about 45% by weight sorbitol coated tablet) were stored in a high temperature (26° C.), high humidity (80% RH) incubator. After two days storage, both the final and intermediate coated products had not absorbed moisture, as detected visually, and the texture and appearance of the pressed tablets was organoleptically satisfactory.

The invention being thus described, it will be obvious that the same may be varied in many ways. Such variations are not to be regarded as a departure from the spirit and scope of the invention and all such modifications are intended to be included within the scope of the following claims.

We claim:

1. An edible coated tablet composition which comprises:
   (a) a core material comprising sorbitol,
   (b) a primary coating layer consisting essentially of zein over the core material, and
   (c) a secondary coating layer over the primary layer, said secondary layer obtained by applying at least one aqueous solution comprising a saturated sorbitol solution, a crystalline sorbitol powder, one or more film-forming agents, and one or more crystallization retarding agents.

2. The composition according to claim 1, wherein the core material comprises the following ingredients:

| Ingredient | Percentage by Weight |
|---|---|
| Sorbitol | 84.00–98.00 |
| Acidulant | 0.50–3.00 |
| Breath freshening agent | 0.50–0.80 |
| Intense sweetening agent | 0.00–0.10 |
| Flavoring agent | 0.50–2.00 |
| Lubricating agent | 0.10–0.50 |
| Vegetable oil | 0.00–0.50 |
| Emulsifying agent | 0.00–0.20 |
| Coloring agent | 0.00–0.03 |
| Fillers | 0.00–15.00 |

3. The composition according to claim 1, wherein the secondary coating layer comprises sorbitol.

4. The composition according to claim 3, wherein the secondary coating layer comprises in percentages by weight:
(a) from about 77% to about 83% of sorbitol solution comprising from about 65% to about 75% sorbitol,
(b) from about 9.5% to about 12.5% crystalline sorbitol powder,
(c) from about 0.25% to about 1.5% of at least one film-forming agent, and
(d) from about 0.1% to about 5.0% of at least one crystallization retarding agent.

5. The composition according to claim 4, wherein the secondary coating layer comprises two coating layers wherein the first coating layer comprises in percentages by weight:
(a) from about 77% to about 83% of sorbitol solution comprising from about 65% to about 75% sorbitol,
(b) from about 9.5% to about 12.5% crystalline sorbitol powder,
(c) from about 0.25% to about 1.5% of at least one film-forming agent, and
(d) from about 0.1% to about 5.0% of at least one crystallization retarding agent, and
the second coating layer comprises in percentages by weight:
(a) about 82% to about 94% sorbitol solution comprising about 65% to about 75% sorbitol,
(b) about 1.0% to about 3.5% crystalline sorbitol powder,
(c) about 0.05% to about 2.0% of at least one film-forming agent, and
(d) about 0.1% to about 0.3% of at least one crystallization retarding agent.

6. The composition according to claim 1, wherein the core material is present in an amount from about 40% to about 60%, by weight of the edible coated composition.

7. The composition according to claim 1, wherein the primary coating layer is present in an amount from about 0.1% to about 1.5%, by weight of the edible coated composition.

8. The composition according to claim 1, wherein the secondary coating layer is present in an amount from about 40% to about 60%, by weight of the edible coated composition.

9. A method for preparing an edible coated tablet composition which comprises the steps of:
(A) providing the following ingredients:
(a) a solid core material composition which comprises sorbitol,
(b) a solution of a primary coating layer composition consisting essentially of zein,
(c) an aqueous secondary coating layer solution comprising a saturated sorbitol solution, a crystalline sorbitol powder, one or more film-forming agents, and one or more crystallization retarding agents; and
(B) forming the core material composition into a suitable tablet shape,
(C) coating the core material from step (B) with the primary coating layer solution,
(D) drying the coated core material from step (C),
(E) coating the coated core material from step (D) with the secondary coating layer solution, and
(F) drying the coated core material from step (E).

10. The method according to claim 9, wherein the core material comprises the following ingredients:

| Ingredient | Percentage by Weight |
|---|---|
| Sorbitol | 84.00–98.00 |
| Acidulant | 0.50–3.00 |
| Breath freshening agent | 0.50–0.80 |
| Intense sweetening agent | 0.00–0.10 |
| Flavoring agent | 0.50–2.00 |
| Lubricating agent | 0.10–0.50 |
| Vegetable oil | 0.00–0.50 |
| Emulsifying agent | 0.00–0.20 |
| Coloring agent | 0.00–0.03 |
| Fillers | 0.00–15.00 |

11. The method according to claim 9, wherein the solution of primary coating layer composition comprises a solution from about 10% to about 20% of zein in aqueous propylene glycol.

12. The method according to claim 9, wherein the solution of secondary coating layer composition comprises sorbitol.

13. The method according to claim 12, wherein the solution of secondary coating layer composition comprises in percentages by weight:
(a) from about 77% to about 83% of sorbitol solution comprising from about 65% to about 75% sorbitol,
(b) from about 9.5% to about 12.5% crystalline sorbitol powder,
(c) from about 0.25% to about 1.5% of at least one film-forming agent, and
(d) from about 0.1% to about 5.0% of at least one crystallization retarding agent.

14. The method according to claim 13, wherein the solution of secondary coating layer comprises two coating layers wherein the first coating layer comprises in percentages by weight:
(a) from about 77% to about 83% of sorbitol solution comprising from about 65% to about 75% sorbitol,
(b) from about 9.5% to about 12.5% crystalline sorbitol powder,
(c) from about 0.25% to about 1.5% of at least one film-forming agent, and
(d) from about 0.1% to about 5.0% of at least one crystallization retarding agent, and
the second coating layer comprises in percentages by weight:
(a) about 82% to about 94% by weight sorbitol solution comprising about 65% to about 75% by weight sorbitol, (b) about 1.0% to about 3.5% by weight crystalline sorbitol powder, (c) about 0.05% to about 2.0% by weight of at least one film-forming agent, and (d) about 0.1% to about 0.3% by weight of at least one crystallization retarding agent.

15. The method according to claim 9, wherein the core material is present in an amount from about 40% to about 60%, by weight of the edible coated composition.

16. The method according to claim 9, wherein the primary coating layer is present in an amount from about 0.1% to about 1.5%, by weight of the edible coated composition.

17. The method according to claim 9, wherein the secondary coating layer is present in an amount from about 40% to about 60%, by weight of the edible coated composition.

18. A method for protecting a moisture-sensitive tablet core material comprising sorbitol which comprises the steps of:

(A) providing the following ingredients:
(a) a solid core material composition which comprises sorbitol,
(b) a solution of a primary coating layer composition consisting essentially of zein,
(c) an aqueous secondary coating layer solution comprising a saturated sorbitol solution, a crystalline sorbitol powder, one or more film-forming agents, and one or more crystallization retarding agents; and (B) forming the core material composition into a suitable tablet shape, (C) coating the core material from step (B) with the primary coating layer composition, (D) drying the coated core material from step (C), (E) coating the coated core material from step (D) with the secondary coating layer composition, and (F) drying the coated core material from step (E).

19. A method for protecting the color of a sugarless coating layer in an edible tablet composition which comprises the steps of:

(A) providing the following ingredients:
(a) a solid core material composition which comprises sorbitol and an acidulant,
(b) a solution of a primary coating layer composition consisting essentially of zein,
(c) an aqueous secondary coating layer solution comprising a saturated sorbitol solution, a crystalline sorbitol powder, one or more film-forming agents, one or more crystallization retarding agents, a coloring agent, and a metal carbonate; and (B) forming the core material composition into a suitable tablet shape, (C) coating the core material from step (B) with the primary coating layer composition, (D) drying the coated core material from step (C), (E) coating the coated core material from step (D) with the secondary coating layer composition, and (F) drying the coated core material from step (E).

* * * * *